(12) United States Patent
Waid

(10) Patent No.: US 11,180,897 B2
(45) Date of Patent: Nov. 23, 2021

(54) RIGID RETAINING BAG

(71) Applicant: Everett Waid, Fort Myers, FL (US)

(72) Inventor: Everett Waid, Fort Myers, FL (US)

(*) Notice: Subject to any disclaimer, the term of this patent is extended or adjusted under 35 U.S.C. 154(b) by 231 days.

(21) Appl. No.: 16/501,458

(22) Filed: May 29, 2018

(65) Prior Publication Data
US 2020/0141080 A1 May 7, 2020

(51) Int. Cl.
*E02B 3/10* (2006.01)
*E02B 3/12* (2006.01)
*E04H 9/14* (2006.01)
*E02B 7/00* (2006.01)
*E02D 29/02* (2006.01)

(52) U.S. Cl.
CPC .............. *E02B 3/127* (2013.01); *E02B 3/108* (2013.01); *E02B 7/005* (2013.01); *E02D 29/0291* (2013.01); *E04H 9/145* (2013.01)

(58) Field of Classification Search
CPC .......... E02B 3/108; E02B 3/127; E02B 7/005; E02D 29/0291
See application file for complete search history.

(56) References Cited

U.S. PATENT DOCUMENTS

| | | | |
|---|---|---|---|
| 4,770,564 A * | 9/1988 | Dison | E04B 1/0007 405/288 |
| 8,721,221 B2 * | 5/2014 | Cavenagh | E02B 3/108 405/114 |
| 8,721,229 B2 * | 5/2014 | Heselden | E01F 8/022 405/302.4 |
| 9,260,830 B2 * | 2/2016 | Schneider | E02B 3/108 |
| 2006/0275084 A1 * | 12/2006 | Harbeck | E02B 3/108 405/116 |
| 2011/0103900 A1 * | 5/2011 | Adams | E02D 29/0291 405/284 |
| 2012/0099809 A1 * | 4/2012 | Schinasi | B65D 88/1625 383/119 |
| 2012/0195687 A1 * | 8/2012 | Beard | E02B 3/108 405/114 |
| 2012/0230766 A1 * | 9/2012 | Schnaars, Sr. | B65B 1/04 405/32 |
| 2013/0094905 A1 * | 4/2013 | Schnaars, Sr. | E02B 3/108 405/114 |
| 2014/0117012 A1 * | 5/2014 | Waid | E02D 29/0291 220/9.4 |
| 2015/0023733 A1 * | 1/2015 | Schnaars, Sr. | E02B 3/108 405/115 |

* cited by examiner

Primary Examiner — Benjamin F Fiorello
(74) Attorney, Agent, or Firm — Stockwell & Smedley, PSC

(57) ABSTRACT

Embodiments of the present invention relate to a bag including at least one flexible sheet of material, a back substantially orthogonal to a bottom, a front opposite the back, and a side comprising an envelope configured to receive a support structure.

16 Claims, 16 Drawing Sheets

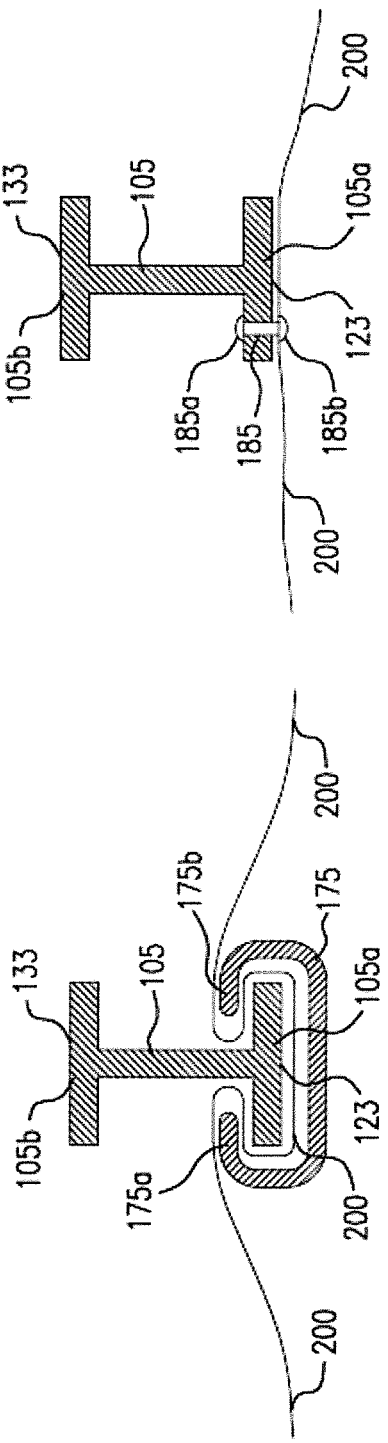
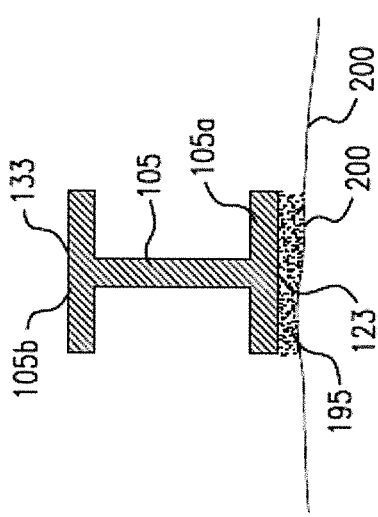

RIGID RETAINING BAG

CROSS-REFERENCE TO RELATED APPLICATION

This application claims priority to U.S. Provisional Application 62/512,412 filed on May 30, 2017.

BACKGROUND

Field of the Invention

The present invention relates to a support structure or partition for use inside a bag for retaining flood waters.

Related Art

Flooding is a major concern for cities, towns, businesses and property owners near bodies of water or in low lying areas. Rainfall and/or storm surge from storms, hurricanes and other meteorological events can cause major damage to property structures. Likewise, rising rivers downstream from these weather events as well as the breach or breaking of man-made structures, such as dams and levees, can result in significant and widespread flooding to nearby areas. Thus, retaining walls or structures may be erected to contain and divert the flood waters and protect the property structures that might otherwise be affected. Sandbags and other methods have been used to construct retaining walls or barriers. However, there is often little notice of an approaching or imminent flooding threat, and many of the existing methods for building retaining structures are labor intensive and slow.

There remains a need in the art for new and improved ways to quickly erect a retaining wall, bag or structure that is effective at retaining flood waters.

SUMMARY

Embodiments of the present invention relate to a bag including at least one flexible sheet of material, a back substantially orthogonal to a bottom, a front opposite the back, and a side comprising an envelope configured to receive a support structure.

Additional embodiments of the present invention relate to a method of erecting a retaining structure including providing a first bag including a side wall including an envelope configured to receive a support structure; placing the support structure inside the envelope; and positioning the first bag in a retention position.

BRIEF DESCRIPTION OF THE DRAWINGS

FIG. 4A is a cross sectional view of the frame of a support structure attached to a wall of the bag with a clip;

FIG. 4B is a cross sectional view of the frame of a support structure attached to a wall of the bag with a fastener;

FIG. 4C is a cross sectional view of the frame of a support structure attached to a wall of the bag with an adhesive;

DETAILED DESCRIPTION

Figure 1:
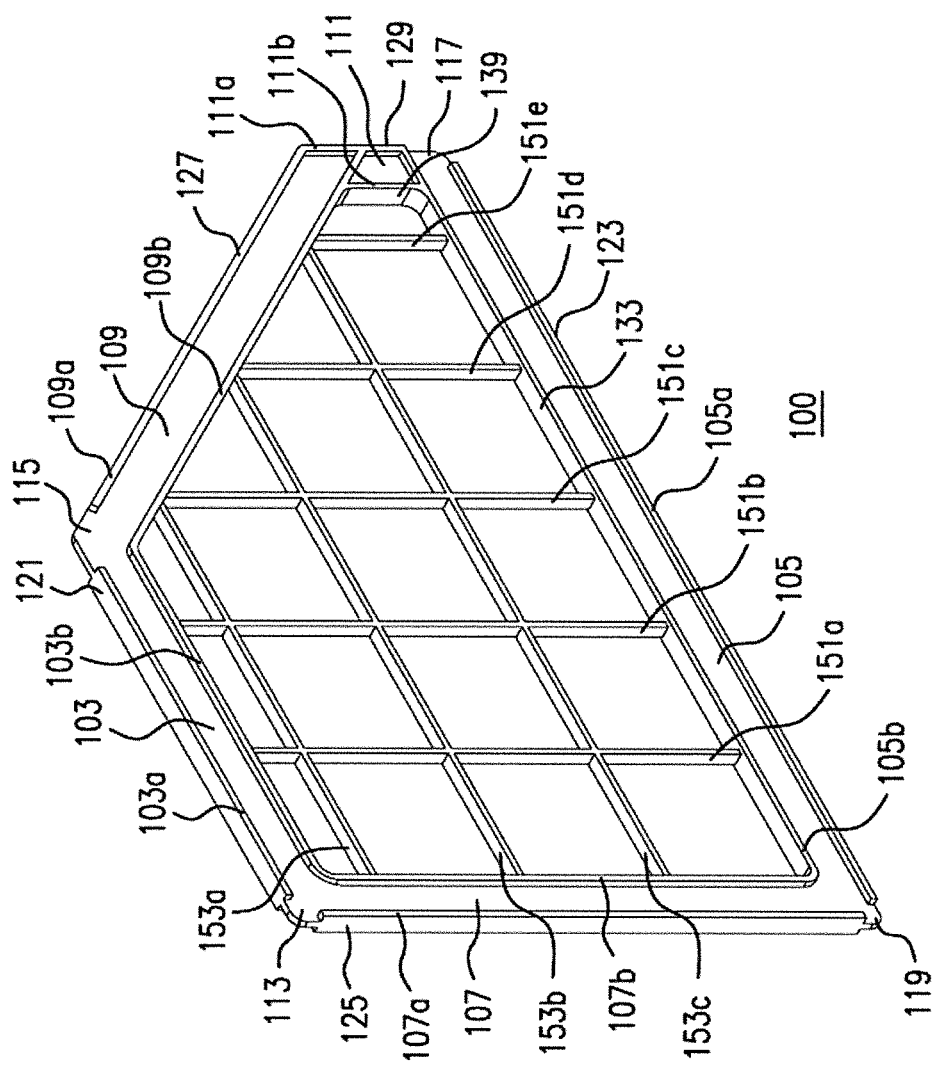
FIG. 1 is a perspective view of a support structure article of the present invention for use as part of a retaining bag.

The present invention relates to a support structure for use inside a bag that is filled with a filling material to build a retaining wall or structure for holding back water to thereby protect buildings, facilities, homes, etc., from floods. Such bag(s) that may be used with a support structure of the present invention may comprise a back wall, a front wall and a bottom wall and may further comprise a plurality of cells aligned from side to side. The bag may comprise a plurality of side walls with each set of adjacent cells of the bag separated by a respective side wall. The side walls may form the ends of the bag to contain the contents of the bag and/or divide adjacent cells of the bag. Such bag(s) may further include a top wall that may be formed as a flap to open and close a top opening of the bag. Together these walls may enclose an interior of the bag to contain a filling material inside the bag, the filling material being used to give weight to the bag so that it can withstand the forces of the flood-waters and remain in place. The filling material may include any suitable material, such as stones, crushed rock, concrete, cement, sand, etc., and/or liquids, such as water, or combinations thereof. The crushed rock may either have an average or nominal particle size of 1 inch or more or 1 inch or less.

Such a bag used with a support structure of the present invention may have a common and continuous top, bottom, back and/or front walls and/or may also comprise a plurality of cells divided by side walls and/or support structures. In general, the back wall of the bag may be approximately perpendicular to the top and/or bottom wall(s) of the bag when the bag is filled, and the top and bottom walls of the bag may be approximately parallel to one another when the top wall (if present) is closed and the bag is filled. For purposes of the present invention, the term "approximately" includes "nearly," "about," "almost" and "exactly." However, the front wall may be slanted at a non-perpendicular angle relative to the top, bottom and/or back wall(s) of the bag. For additional description of a bag(s) that may be used with the support structure of the present invention, see, e.g., U.S. patent application Ser. No. 12/590,184, now U.S. Pat. No. 8,235,631, and U.S. patent application Ser. No. 13/442,152, the entire contents and disclosures of which are incorporated herein by reference.

"About," as used herein, means within plus or minus one at the last reported digit. For example, about 1.00 means 1.00±0.01 unit.

"Around," when used to describe a unit or percentage, means within plus or minus one unit or plus or minus one percentage point, respectively.

For the purposes of this disclosure, "and" and "or" shall be construed as conjunctive or disjunctive, whichever provides the broadest disclosure in each instance of use of "and" or "or."

The support structure of the present invention may be inserted into the interior of the bag in an upright orientation to keep the bag "standing up" and extended in a vertical direction until enough filling material has been poured into the bag for the filling material itself to support the bag. Indeed, the walls of the bag may be made of any suitable flexible material in the form of a sheet that can collapse and fold when it is empty and/or conform to the shape of the filling material when the bag is filled. Although the walls of the bag are flexible and bendable, the material should also be rugged and resilient enough to contain the filling material and withstand the forces of the floodwaters. Thus, the walls of the bag may be made of any combination of woven and nonwoven materials, films, fabrics, plastic sheets, wire mesh, etc., or any combinations thereof. Thus, the support structure of the present invention may be inserted into, and/or form a functionally integral part of, the bag, which may help to keep the bag supported until and while a filling material is poured into the bag. This may be due at least in part to the walls of the bag being supported around an outer periphery of the support structure (i.e., around and on the outer surfaces of the sides of the support structure frame). Multiple support structures may be inserted into, and/or form part of, the bag and aligned substantially or approximately in parallel with each other such that the bag with the support structures may be collapsed in its lengthwise or longitudinal dimension. Prior to filling the bag with a filling material, a bag with a plurality of the support structures placed therein may be extended or pulled out like an accordion from a collapsed state to place the bag into a desired position. This extension and placement may be done quickly since the support structures help to maintain the bag in an upright position. Once filled with the filling material, the support structure(s) inside the bag may continue to function in providing additional strength and resiliency to the bag.

A support structure of the present invention may have a plurality of crossing members with spaces or openings between them to allow a filling material to flow through it and spread out between adjacent compartments or cells of the bag separated by and on either side of the support structure. These crossing members may have any of a variety of different cross-sectional shapes, such as rectangular, square, diamond, circular, oval, etc., and a variety of suitable sizes or thicknesses. According to other embodiments, however, one or more of the support structure(s) inside the bag may be solid without openings or spaces between the crossing members that may function as a partition or barrier to contain and separate the contents or filling material of the bag on either side, such as between adjacent cells. Alternatively, a support structure having crossing member(s) with spaces or openings between them may still form a solid barrier in conjunction with a side wall of the bag itself, such as between adjacent cells of the bag. Such a partitioning or barrier function may allow the support structure to be used as one or both of the two ends of the bag to contain the contents or filling material inside the bag. Such a partitioning or barrier function of a support structure of the present invention may also help to secure a retaining wall or bag when it is breached or damaged by maintaining separate compartments, especially when a liquid filling material, such as water, is used.

A support structure of the present invention may comprise an outer frame that surrounds an inner space with crossing members spanning across the inner space from one side to another side of the frame. The support structure may have a mostly two-dimensional or planar shape with varying thicknesses in a third dimension depending on its exact design and construction. However, these thickness dimension(s) may be much less than the two planar dimensions. The crossing members within the inner space may include a first set or subset of crossing members that intersect a second set or subset of crossing members at an approximately perpendicular or other angle. The crossing members may provide strength and rigidity to the support structure. In general, spaces or openings may be present between the crossing members, such that the filling material in a bag may flow through the support structure to contact and exchange with the contents or filling material on the other side. However, according to other embodiments, the network of crossing members of a support structure may instead form part of a barrier or partition that physically separates the contents of the bag present on either side, such as by supporting a thin sheet or web of the support structure that fills the area between the crossing members. Alternatively, the network of crossing members may help support a thin sheet of material, such as a fabric portion or side wall of the bag, to separate and form a barrier between the two sides, which may be two adjacent cells of a bag.

The support structure of the present invention may be made as a single integral unit and may be made of any suitably rigid material including plastic, wood and/or metal (including wire mesh) and any combinations thereof. The support structure may be made by any suitable process(es), such as by injection molding, etc. The support structure of the present invention may be a single piece that may be made by one process, or it may comprise two or more units or pieces that may be securely coupled together (e.g., snapped or welded together, etc.). According to these embodiments, a plurality of fasteners (e.g., corresponding snap locks, etc.) may be used to hold the two or more pieces together. For example, the support structure may comprise a first bisected portion and a second bisected portion, each bisected portion or half having generally planar dimensions that approximate the two-dimensional shape of the assembled article (i.e., when the two portions or halves are coupled or fastened together). The fabric or material of a side wall (such as a side wall dividing two adjacent cells) may be sandwiched between the two bisected portions when fastened together.

Figure 2:
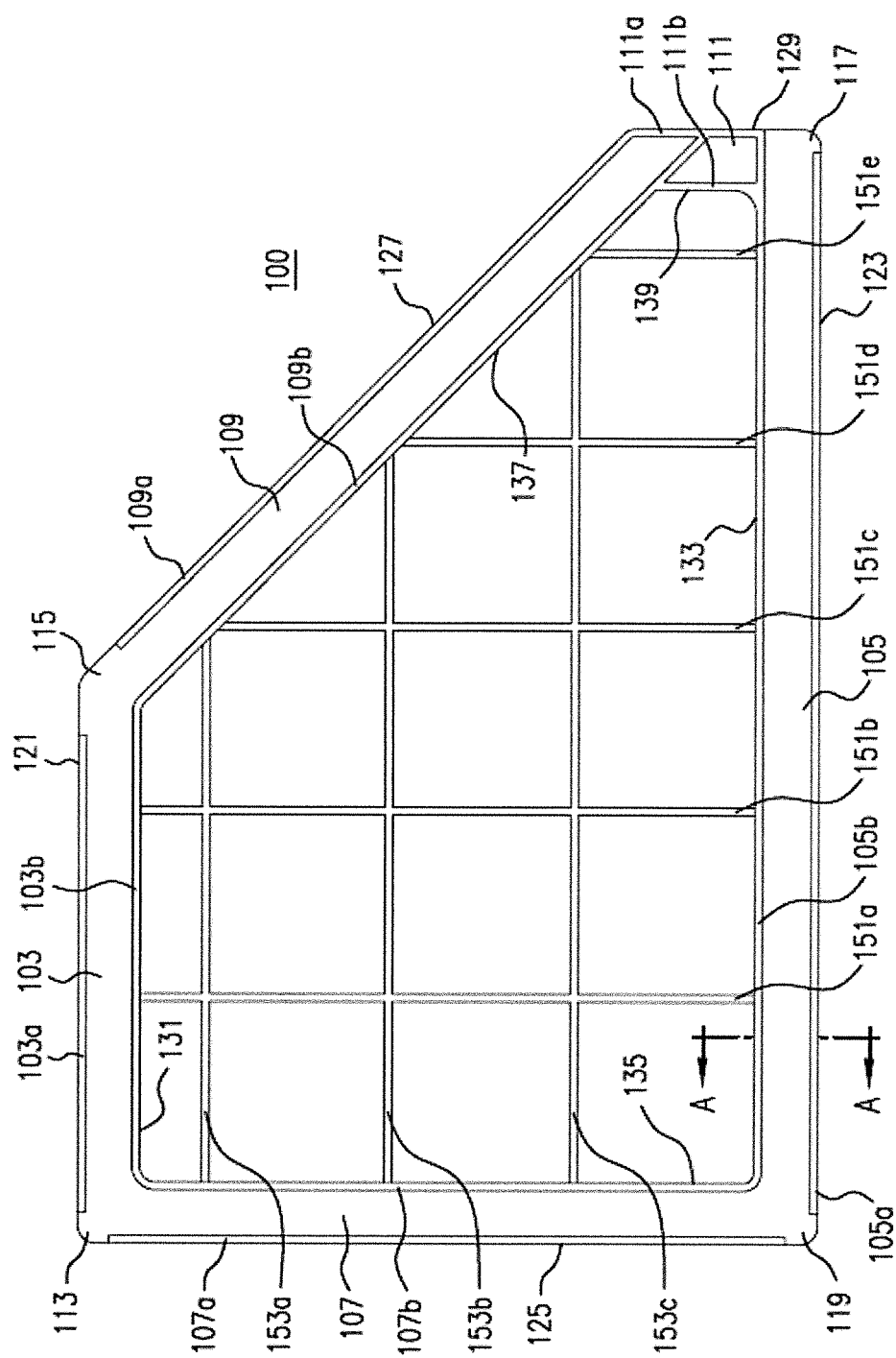
FIG. 2 is a side view of the support structure article shown in FIG. 1.

FIGS. 1 and 2 provide two views of an embodiment of a support structure 100 of the present invention. The support structure comprises a frame having a top side 103, a bottom side 105, a back side 107, a slanted front side 109 and a straight front side 111. The back side 107 of the frame may be approximately perpendicular to both the bottom side 105 and the top side 103 of the frame, and the top and bottom sides 103, 105 may be approximately parallel to each other. The straight front side 111 may also be approximately parallel to the back side 107. Each of the sides may have a narrower middle area or portion between two wider flanges or edges. The wider flanges or edges may function to provide additional strength (much like an I-beam) and also to possibly provide a corresponding structure for fastening a wall of the bag to the support structure. The top side 103 of the frame may thus include an outer flange 103a and an inner flange 103b, the bottom side 105 may include an outer flange 105a and an inner flange 105b, the back side 107 may include an outer flange 107a and an inner flange 107b, the slanted front side 109 may include an outer flange 109a and an inner flange 109b, and/or the straight front side 111 may include an outer flange 111a and an inner flange 111b. Each of the outer flanges has a respective outer surface 121, 123, 125, 127, 129, and each of the inner flanges has a respective inner surface 131, 133, 135, 137, 139. Each pair of adjacent outer flanges may be separated by a respective open corner 113, 115, 117, 119 such that the adjacent flanges are not continuous. Such openings may be used to facilitate or enable fastening of the fabric or material of the bag to the retaining structure with an additional fastener as further explained below. For purposes of the present invention, the terms "outer surface" and "inner surface" refer to the outer and inner surfaces of the frame regardless of whether flanges are present.

The sizes and dimensions of the support structure may vary and may correspond to (i.e., be about the same as) the inner dimensions of the bag that it would be used to support. Accordingly, the back side of the frame of the support structure may for example be in a range from about 1¼ feet to about 12 feet long, such as from about 2 feet to about 6 feet, or about 2, 4 or 6 feet long, and/or the bottom side of the frame of the support structure may be in a range from about 1½ feet to about 14 feet long, such as from about 2 feet to about 8 feet, or about 2, 3, 5, 6, 7 or 8 feet long. The thickness of the support structure may vary between ⅛ inch and a few inches, such as from about ¼ to about ¾ inch. For example, the flanges of a respective side may be about ¾ to about 2 inches thick, whereas the portions between the flanges may be about ¼ to about 1 inch thick. The top side 103 of the frame of the support structure may vary depending on the length, position and angle of the slanted front side 109, but the top side 103 of the frame may for example be about 1 foot to about 12 feet, such as about 3 or 4 feet. The angle between the slanted front side 109 and the straight front side 111 may vary from about 110° to about 170° (i.e., the slanted front side may be angled from about 10° to about 70° off of a vertical line), or the angle between the slanted front side 109 and the straight front side 111 may vary from about 120° to about 160°, or it may be about 135 (i.e., slanted front side may be angled about 45° off of a vertical line). The length of the straight front side 111 may vary and may for example be between about 6 inches and about 3 feet, such as about one foot. The length of the slanted front side 109 will depend accordingly. Other dimensions are also possible.

Adjacent crossing members of each of a first set and a second set of crossing members may be spaced apart by a constant distance along their length (if parallel) or by a changing distance (if non-parallel). Such a spaced apart distance between adjacent crossing members of each set may vary for example between about 2 inches and about 24 inches, or from about 6 to about 18 inches, such as about 12 inches. If both an inner and outer flange are present on a side of the frame, the spacing between the inner and outer flanges of each side of the frame may be the same or different among the different sides of the frame and such spacing may vary for example from about ½ inch to about 5 inches, such as about 2 inches.

Figure 3:
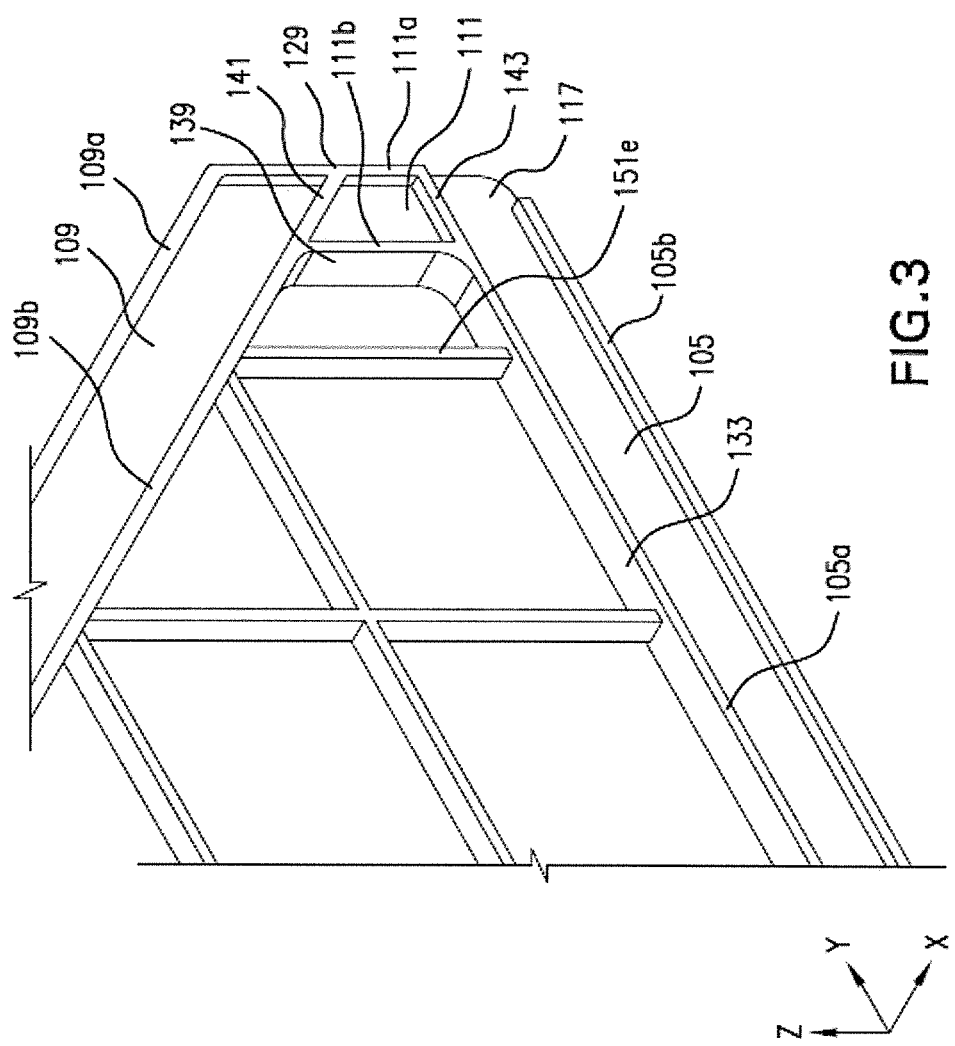
FIG. 3 is a perspective view of a front-bottom corner of the support structure article shown in FIG. 1.

The bottom side and/or the slanted front side of the support structure frame may be longer than the back side of the support structure frame. According to some embodiments as shown in FIGS. 1, 2 and 3, the front of the support structure frame may include both a slanted front side 109 and a straight front side 111 such that the slanted front side 109 and bottom side 105 do not extend to a point where the two sides might otherwise meet. Instead of meeting at a point, the straight front side 111, which may be nearly, approximately or exactly parallel to the back side 107 of the frame, joins and connects the bottom and slanted front sides 105, 109. Accordingly, the bottom side and slanted front side would be shorter with these embodiments than if they extended and met at a point. It is believed that by providing a straight front side, the support structure may be stronger and less susceptible to breaking or cracking. Straight front side 111 of support structure 100 is shown in a close-up view in FIG. 3 to show additional optional flanges 141, 143 extending from inner flange 109b of slanted front side 109 and inner flange 105b of bottom side 105, respectively, to outer flange 111a of straight front side 111. However, these optional flanges 141, 143 may be absent. As another alternative, the bottom and slanted front sides could extend and meet at a point without a straight front side.

In addition to the frame, there may also be a plurality of crossing members within the space between the sides of the frame spanning from one side of the frame to another (i.e., from one inner surface of the frame to another) to provide structural support to the frame and the article or support structure as a whole. According to some embodiments, such a plurality of crossing members may comprise multiple sets or subsets of crossing members, such as a first set or subset of crossing members and a second set or subset of crossing members. The first set of crossing members may not intersect each other but may intersect the second set of crossing members. Likewise, the second set of crossing members may not intersect each other but may intersect the first set of crossing members. The first and second set of crossing members may intersect at a perpendicular or other angle. The crossing members may also be oriented at non-perpendicular angle(s) relative to the frame, and the crossing members of each of the first set or the second set of crossing members may not be parallel to each other.

FIGS. 1, 2 and 3 provide an embodiment of the present invention showing a first set of crossing members 151a, 151b, 151c, 151d, 151e oriented vertically (and parallel to the back side of frame) and a second set of crossing members 153*a*, 153*b*, 153*c* oriented horizontally (and parallel to the top and bottom sides of frame). Accordingly, each of the first set of vertical crossing members is perpendicular to each of the second set of horizontal crossing members. The embodiment in these figures shows open spaces between the crossing members of the support structure, but as mentioned above, a thin web or sheet of material may span and fill the space between the crossing members to create a barrier to prevent or reduce the flow of filling material through the support structure. This may be useful when a liquid or fine filling material is used to fill the bag to provide resiliency against puncture or breach of the bag.

Once the support structure of the present invention is inserted into a desired position within the bag, it may be connected, attached or secured to the bag in any of a variety of suitable ways. As a few examples, the outer surface(s) of the support structure may be adhered or glued to the bag, the frame of the support structure may be welded to the bag, the bag may be clamped to the frame of the support structure, a fastener may penetrate the bag and engage the support structure, the support structure may be trapped in the bag, such as by mounding an initial amount of filling material around the base or bottom of the support structure or by placing the support structure against a side wall of the bag, etc., before filling up the bag with the filing material.

FIG. 4 provides a few example embodiments for attaching, fastening, etc., the bag to the support structure, showing attachment of the fabric of the bag, for example, to the bottom side of the support structure in cross section at a position indicated by line A-A in FIG. 2. A similar form of attachment of the bag fabric to other side(s) of the frame may be used. Indeed, the bag fabric may be attached to one or more of the top side 103, back side 107, bottom side 105, slanted front side 109, and/or straight front side 111 of the support structure. However, the bag fabric may not be attached to the bottom side 105 of the frame.

FIG. 4A shows an embodiment in which an elongated clamp 175 with two wrapping portions 175*a*, 175*b* that envelop outer flange 105*a* to hold fabric 200 of bag to the support structure. Clamp 175 may be snapped onto frame or may be slid over fabric and frame from a corner. Open corners 113, 115 117, 119 allow a sliding clamp to engage the frame by one end of the elongated clamp 175 entering one of the open corners and then sliding down the length of a side of the frame adjacent to the open corner and wrapping around the corresponding outer flange. As an alternative, smaller individual clamps may instead be used. FIG. 4B provides another embodiment for attaching or fastening the fabric 200 of the bag to the side 105 of the frame of the support structure. One or more fastener(s) 185 may be used that penetrate the fabric 200 and engage a portion of the outer flange 105*a* of the side 105 of the frame. Such a fastener(s) may have a shaft portion and two wider portions 185*a*, 185*b* that hold the bag to the frame by engaging an inner surface of the outer flange 105*a* and the outer surface of the bag, respectively. This will hold the bag 200 against the outer surface 123 of the frame. A wide variety of known fastener(s) may be used to fulfill this purpose including any suitable rivet, screw, bolt, snap-lock, staples, etc. FIG. 4C provides yet another example for attaching the bag to the frame. An adhesive or glue 195 may be used to secure the bag to the frame between the inner surface of the bag 200 and the outer surface 123 of the frame. However, these examples in FIG. 4 are merely illustrative, and any other suitable form of attachment, etc., may also be used.

However, these attachment examples are not exhaustive, and any suitable attachment method may be used. As an additional example, various ties, such as ties, wires or straps made of plastic, metal, string, yarn, etc., may be used to secure the bag to the support structure, such as by wrapping around the frame of the support structure. As another example, open rings, such as hog rings, may be clamped to secure the bag to the support structure, such as through a hole in the frame of the support structure. Such open rings may be useful if the bag itself is made of a wire or wire mesh. As yet another example, a plastic or metal banding may be used that extends around the top, back, bottom and front walls of the bag to make a vertical loop at a position where the support structure is located underneath the bag. Such banding material may be tightened and/or attached to the support structure by any suitable method. To accommodate the flap or top wall, a hole that may be reinforced, such as with a grommet, may be used to allow the banding to poke through and not interfere with the flap or top opening.

In contrast to the embodiment shown in FIGS. 1, 2 and 3, the outer frame of the support structure may have a variety of cross sections, such as rectangular, square, etc. In addition, one or both of the inner and/or outer flanges may be absent on one or more sides of the frame especially if not needed for the fastening. Indeed, one or more sides of the frame may have a "T-beam" shape with one of the inner or outer flanges absent on a respective side(s) of the frame. However, the I-beam shape may be preferred as a way to increase strength and rigidity while minimizing the amount of material used. Moreover, even if the "I-beam" design is used for the frame of the support structure, one or more of the open corners may be absent (i.e., the respective outer flanges may be continuous without a gap or opening).

According to other embodiments, a bag comprising one or more support structures disposed therein are also provided. Such a bag of the present invention may comprise a fabric that is wrapped around an outer periphery (i.e., the outer surfaces of the sides of the frame) of the one or more support structures, such that the fabric forms a slanted front wall, a straight front wall, a bottom wall, and a back wall corresponding to the sides of the support structure. Each of these "walls" of the bag may be formed by a continuous piece of fabric. In addition, one or more side walls and/or a top wall of a fabric may also form part of the bag. A bag comprising one or more side walls may have a plurality of cells defined by the side walls (i.e., each of the side walls may separate adjacent cells of the bag). The top wall may be disposed as a flap to move from an open to a closed position, the open position allowing a filling material to be put into the bag. The one or more side walls may be attached to the slanted and straight front, back and/or bottom walls by any suitably method including stitching, sewing, gluing, bonding, fastening, welding, etc. According to some embodiments, the attachment between the side wall(s) and the slanted and straight front, back and/or bottom walls may be continuous, such as to form a seal, or it may have gaps or openings in one or more places.

According to these embodiments, one or more planar support structures as described herein may be inserted, placed, disposed, etc., inside the bag in an arrangement that is nearly, approximately or exactly perpendicular to the slanted front, straight front, bottom and back walls of the bag that correspond to the respective sides of the support structure. If two or more support structures are inserted, placed, disposed, etc., inside the bag, then they may be arranged nearly, approximately or exactly parallel in relation to each other. According to some embodiments, a single sheet of fabric may be folded and wrapped around the one or more support structures to form the bag with the shape of the support structures determining the shape of the bag including the walls of the bag as discussed herein. For example, the single sheet of fabric of the bag may begin at or near the junction of the top side and the slanted front side of the support structure and extend around the front sides, bottom side and back side of the support structure(s) and held in place by attachment, etc., to the frame of the support structure(s) by any suitable method as described herein. The single sheet of fabric may also extend beyond the top corner of the back side of the support structure to form a foldable or movable flap that may be closed to form a top wall of the bag (i.e., by folding the distal edge of the flap down to meet the bag near the corner where the top side and slanted front side of the support structure meet). In other words, the flap may be folded down to form the top wall of the bag and close the top opening of the bag. Alternatively, the flap may be absent or kept open (i.e., folded back) during use of the bag. Alternatively, the bag may comprise more than one sheet or piece of fabric that may be connected, attached, etc., together, especially for any side wall(s).

The bag of the present invention has an elongated shape with a longitudinal axis, the longitudinal or lengthwise dimension being approximately parallel to the front, bottom and back walls of the bag. A plurality of support structures may be placed inside the bag at spaced-apart distances with the plane of each of the support structures being approximately perpendicular to the longitudinal axis of the bag. The spaced-apart distances between adjacent support structures along the length of the bag may be the constant or variable and may be in a range from about 0.30 meters (1 foot) to about 2.4 meters (8 feet), such as about 0.6, 0.9, or 1.2 meters (2, 3 or 4 feet). To contain a filling material that may be deposited into the bag, the two ends of the bag (in the longitudinal axis) may be enclosed by either a fabric of forming the end of the bag (e.g., by folding the fabric material of the bag or by attaching a separate end piece of fabric to the bag), or by use of a support structure partition that forms a solid barrier without openings or spaces to contain the contents or filling material of the bag.

Figure 5:
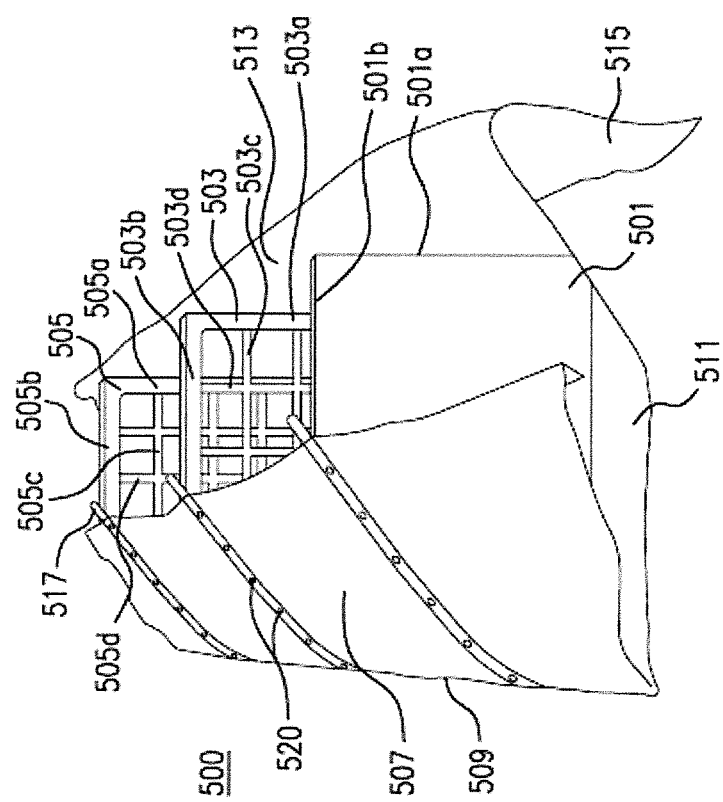
FIG. 5 is a perspective view of the bag of the present invention with a plurality of support structures inserted therein.

FIG. 5 shows a bag 500 according to an embodiment of the present invention. The bag may comprise a single sheet of fabric wrapped around the perimeter of a plurality of support structures 501, 503, 505. The bag is shown truncated at the far end for purposes of presentation in the figure but may actually be much longer with additional spaced-apart support structures. Due to the shape of the support structures underneath, the sheet of fabric of the bag 500 wrapped around the support structures is shaped to form a slanted front wall 507, a straight front wall 509, a bottom wall 511, and a back wall 513 of the bag 500. A flap 515 is also present shown hanging down from near a top-back corner of the support structures. The flap 515 may be folded over the top of the bag such that the distal edge of the flap 515 reaches the slanted front wall 507 to form a "top wall" that covers and closes the top opening of the bag 500 (not shown). A first support structure 501 is shown as a partition without spaces or openings on one end of the bag, such that a filling material loaded into the bag 500 through a top opening does not spill out the side end of the bag. In addition, a second support structure 503 and a third support structure 505 are shown in the truncated segment of the bag 500 with each having crossing members that provide strength to the bag but allow the filling material to flow through.

The second support structure 503 is shown having a frame including a back side 503a, a top side 503b, a slanted front side (not visible), a straight front side (not visible) and a bottom side (not visible). The second support structure 503 further has a first set of crossing members 503c and a second set of crossing members 503d that are shown to intersect at approximately right angles. Likewise, the third support structure 505 is shown having a frame including a back side 505a, a top side 505b, a slanted front side (not visible), a straight front side (not visible) and a bottom side (not visible). The third support structure 505 further has a first set of crossing members 505c and a second set of crossing members 505d that are shown to intersect at approximately right angles. To attach the sheet of fabric to the support structures, a variety of attachment types and methods described above may be used, which may include fasteners 520, such as rivets, etc., as shown. These attachments may be aligned in a row (or nearly a row) to correspond to the placement of a respective support structure. A reinforced strip may also be provided where these attachments pierce the wall of the bag to avoid or minimize tearing of the bag 500. In addition, pull tabs 517 may also be provided at the top near the junction of the top side and slanted front side of the support structures to assist with maneuvering the bag.

The present invention further proposes methods for making and using any of the support structure(s) as well as any bag comprising one or more support structure(s) of the present invention as described herein. According to one set of embodiments, a method is provided for making, assembling, etc., a bag comprising one or more support structures. In a first step, a support structure may be inserted or placed into a bag, which may be followed by additional step(s) of inserting or placing additional support structure(s) into the bag. According to some embodiments, the bag may already be formed or configured to have front, back, bottom, and side walls. Thus, the support structure(s) may be inserted into the preformed bag to give it more rigidity and keep it standing up. The support structures may be placed at predetermined or desired positions within the bag relatively in an approximately parallel arrangement with a predetermined or desired spacing. According to some embodiments, one or more of the support structures may be placed next to one or more of the side walls of the bag. According to other embodiments, two side walls of the bag may be closely spaced apart, such as by a distance approximating the widest dimension of a support structure, to provide a sleeve or slot into which a support structure may be inserted and held in place.

According to other embodiments, the bag may not be preconfigured or preformed into a shape but may instead be formed or shaped around support structure(s). According to these embodiments, a flexible sheet material, which may be one continuous sheet of material, may be wrapped around an outer periphery of the support structure(s) tightly enough to form the walls of the bag conforming to the outer shape of the support structure(s). As a result, the bag may have a straight front wall, a slanted front wall, a bottom wall and a back wall corresponding to the respective sides of the support structure(s). A top opening may also be formed for receiving a filling material with or without a flap for closing the top opening. The size and shape of the support structures used, inserted, placed, etc., in a same bag may be approximately the same to create a uniform cross-sectional shape along the length of the bag.

Regardless of whether the bag is formed around the support structure(s) or the support structure(s) are inserted into a preformed bag, the wall(s) of the bag may be attached, fastened, etc., to the support structure(s) in any suitable manner as described above. Finally, the bag may be filled with one or more filling material(s).

According to some embodiments, a bag of the present invention formed by any method may be collapsed in its lengthwise direction such that the support structures are brought closer together. This collapsing of the bag may facilitate storage and transporting of the bag to a desired location. When setting up the bag for use, the bag may be extended from a collapsed state in its lengthwise direction and the support structures separated from each other at a desired location until the front, bottom and back walls of the bag are fully extended (e.g., substantially planar). Finally, the bag may be filled with one or more filling material(s).

While the present invention may have been disclosed with reference to certain embodiments, it will be apparent that modifications and variations are possible without departing from the spirit and scope of the invention as defined herein. Furthermore, it should be appreciated that any and all examples in the present disclosure, while illustrating embodiments of the invention, are provided as non-limiting examples and are, therefore, not to be taken as limiting the various aspects so illustrated. The present invention is intended to have its full scope consistent with the following claims, and equivalents thereof. Accordingly, the drawings and description are to be regarded as illustrative and not as restrictive.

FIGS. 6A-11 depict an additional embodiment of the present invention. These embodiments may be substantially similar to the embodiments described above and may have the following features.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the figures, description and in the claims, the terms "front", "back", "side", "bottom" etc. are used to simplify referring to a particular embodiment of a bag. However, one of ordinary skill will recognize that these terms are relative and that the shape of the bag and its relative dimensions remain the same when viewed from different perspectives or used in different orientations. Thus, use of these terms is not intended to limit embodiments of the present invention to bags having only a single orientation in space.

Figure 6A:
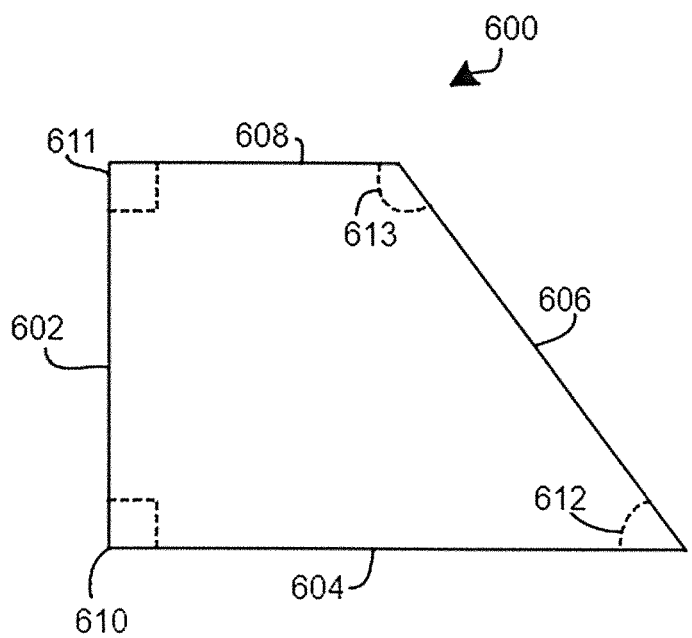
FIG. 6A is a side view of a portion of a bag in accordance with the principles of the present invention.
Figure 6B:
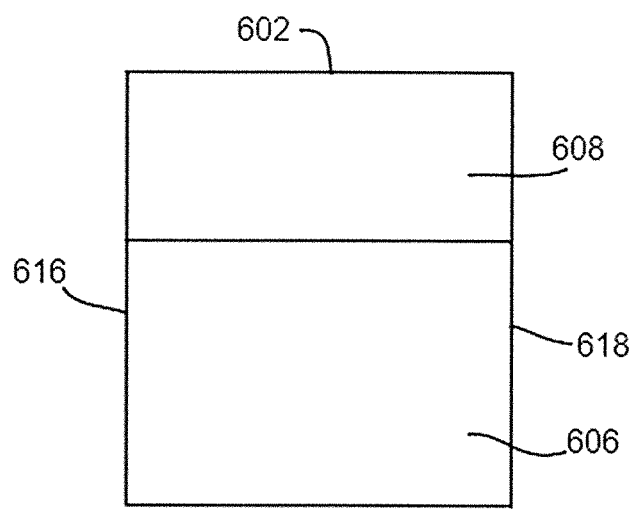
FIG. 6B is a top view of a portion of a bag in accordance with the principles of the present invention.

FIGS. 6A and 6B show, respectively, a side view and a top view of a portion of a bag in accordance with the principles of the present invention. In FIG. 6A a cross-sectional view of a bag 600 is depicted. The side cross-section of the bag 600 may be in the shape of a right pentagon, as depicted. The bag 600 may comprise a back wall 602, a bottom wall 604, and a front wall 606. The top 608 may include a top wall or be open. If there is a top wall present, then it may be configured in such a way that it connects with either the back wall 602 or front wall 606 to form a flap. Such a flap would be moved out of the way to allow the bag 600 to be filled and then positioned over the bag 600 once it is filled.

Of particular benefit to the bag 600 are the relative angles formed by the different walls and their respective lengths. The right angle 610 formed by the back wall 602 and bottom wall 604 adds stability and versatility to the use of the bag 600. The right angle 611 formed along the top edge of the back wall 602 also provides stability and versatility.

Making the bottom wall 604 longer than the back wall 602 provides a shape that adds stability to a structure erected using the bag 600. By making the bottom wall 604 longer than the back wall 602, the angles 612 and 613 are formed at each edge of the front wall 606 and the front wall 606 is longer than the back wall 602.

One of ordinary skill will recognize that the bag 600 of FIG. 6A may be have a variety of sizes while keeping the relative lengths and angles as discussed above. Thus, embodiments of the present invention are not limited to a particular size of bag 600. However, the use of ordinary heavy machinery to fill and move a bag 600 makes certain sizes for the bag 600 more practical than others. For example, the top opening 608 may be between about 0.3 meters (1 foot) to about 0.6 meters (2 feet) in length and width to accommodate typical front-end loader buckets (or specialized filling equipment). The back wall 602 may vary from about 1.2 meters (4 feet) to about 2.4 meters (8 feet) in length and a corresponding bottom wall would vary from about 2.1 meters (7 feet) to 3.3 meters (11 feet) in length. These relative dimensions and sizes are provided as examples and not as a limitation of which sizes are contemplated within the scope of the present invention.

As for material, the bag 600 can be constructed from polypropylene or similar material that can withstand the elements of a harsh environment. In particular, the material can be a weaved material with the weave spacing and thickness selected based on such things as the type of fill material being used to fill the bag, and the degree to which the bag is intended to retain fluid such as water. In addition, the bag may be coated with a water-proof seal if it is intended to be substantially impervious to water flow. One of ordinary skill will recognize that the specific material of the bag can be selected so as to be suitable for the intended application of use. A material can be selected that is woven or unwoven, impervious to fluid or porous, rugged or biodegradable without departing from the intended scope of the present invention.

The fill material contemplated within the bag 600 includes sand, sand mixed with stones, cement or concrete, and crushed rock of various sizes. Alternatively, recycled materials from tires and plastics may also be used that can be condensed to form a solid filling material.

In addition to the back wall 602 and side wall 606, already discussed, the view of FIG. 6B also shows a first side wall 616 and a second side wall 618. The fill material may be delivered to inside the bag 600 through the top opening 608. The first side wall 616 may comprise an envelope. The second side wall 618 may comprise an envelope.

Figure 7A:
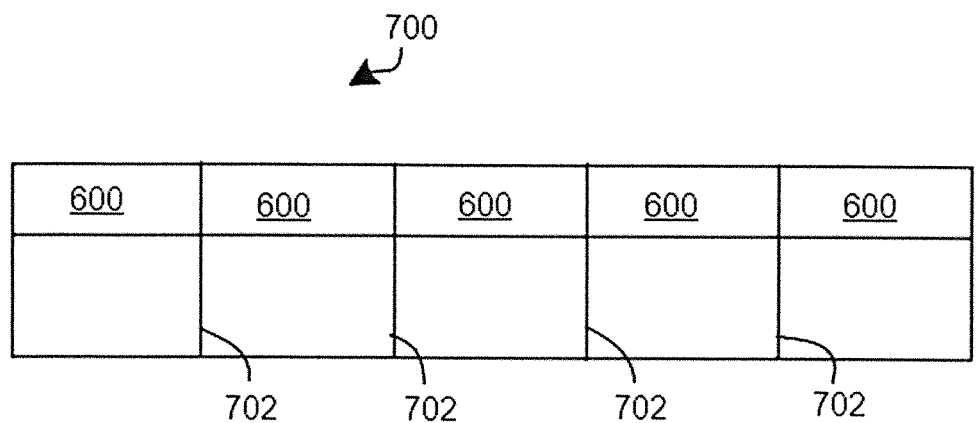
FIG. 7A is a top view of a portion of a bag in accordance with the principles of the present invention.

FIG. 7A shows a top view of a portion of a bag in accordance with the principles of the present invention. The bag 700 of FIG. 7A shows that adjacent bags 600 are aligned to extend along a first direction. Thus, the bags 600 discussed above can more properly be referred to as bag cells 600 such that a bag 700 is comprised of a plurality of bag cells 600 adjacent to one another. In this arrangement, there is a side wall 702 that is shared by adjacent cells 600. Thus, referring to FIG. 6B and FIG. 7A, the shared wall 702 would correspond to the second side wall 618 of one bag cell 600 and also correspond to the first side wall 616 of an adjacent bag cell 600. Each such shared wall 702 may have a cross-section that resembles that depicted in FIG. 6A.

Figure 7B:
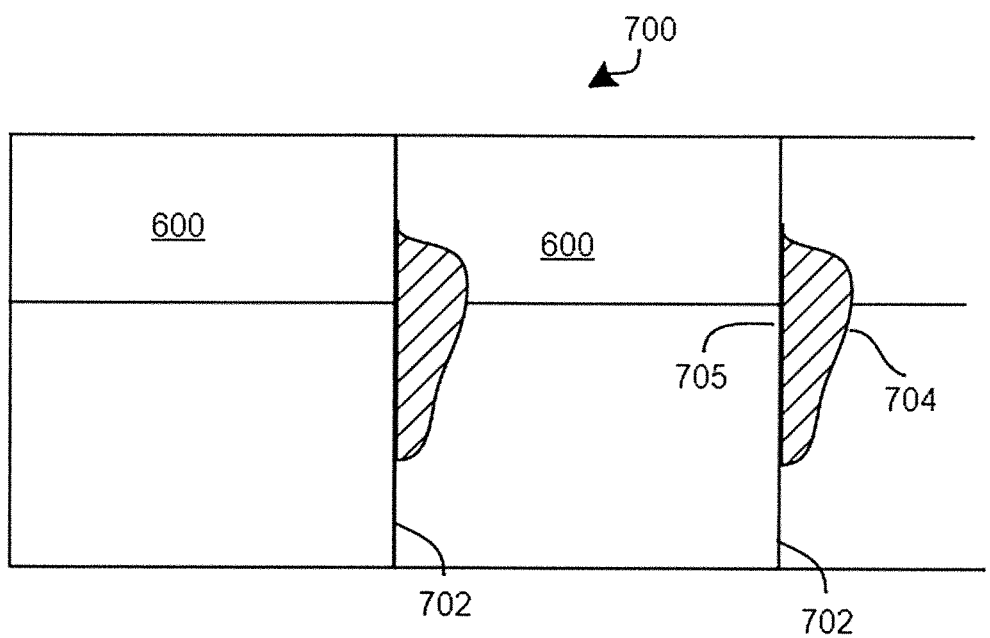
FIG. 7B is a side-wall deformation of the bag of FIG. 7A in accordance with the principles of the present invention.

FIG. 7B shows a side-wall deformation of the bag of FIG. 7A in accordance with the principles of the present invention. Two adjacent shared walls 702 are shown in the view.

In particular, each shared wall is constructed of a material (such as those described above) that is flexible enough to bow out in its center but rigid enough to substantially retain its shape along its edges.

For example, when cells 600 are filled with fill material, the top edge 705 (and the bottom edge, not shown) of the shared wall 702 substantially retain their shape but the material of the shared wall 702 stretches or bulges to create the bump 704. While selecting a material rigid enough to prevent this bump 704 can be accomplished, the bump 704 has benefits. For example, the bump 704 extends into the adjacent bag cell and tends to tie the whole structure together rather than allowing adjacent cells to slip or slide with respect to one another.

However, embodiments include the shared wall 702 comprising an envelope configured to receive a support structure. The support structure may aid in supporting the bag cells 600 such that the bag cells 600 may not necessarily collapse upon deformation. Example support structures materials include coroplast, or any other material sufficient to provide both rigid support and deformability.

Figure 7C:
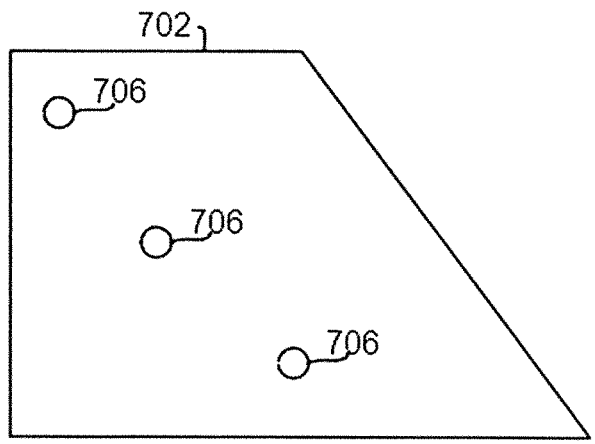
FIG. 7C is an alternative side-wall embodiment of the bag of FIG. 7A in accordance with the principles of the present invention.
Figure 7D:
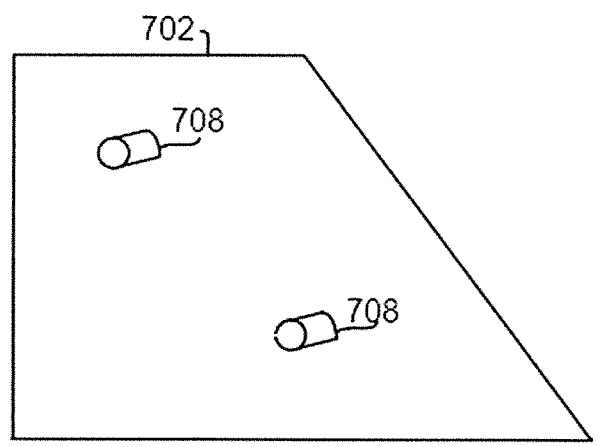
FIG. 7D is an alternative side-wall embodiment of the bag of FIG. 7A in accordance with the principles of the present invention.

FIGS. 7C and 7D show alternative side-wall embodiments of the bag of FIG. 7A in accordance with the principles of the present invention. In FIG. 7C, one or more holes 706 are present in the shared wall 702, these holes allow filling material in one bag cell to contact with filling material in an adjacent bag cell. In one particular example, if the filling material is cement or concrete, then the holes may allow adjacent cells to tie into one another.

In FIG. 7D, there are one or more protrusions 708 in the shared wall 702. These protrusions can be located on one side or both sides of the shared wall 702.

Figure 8:
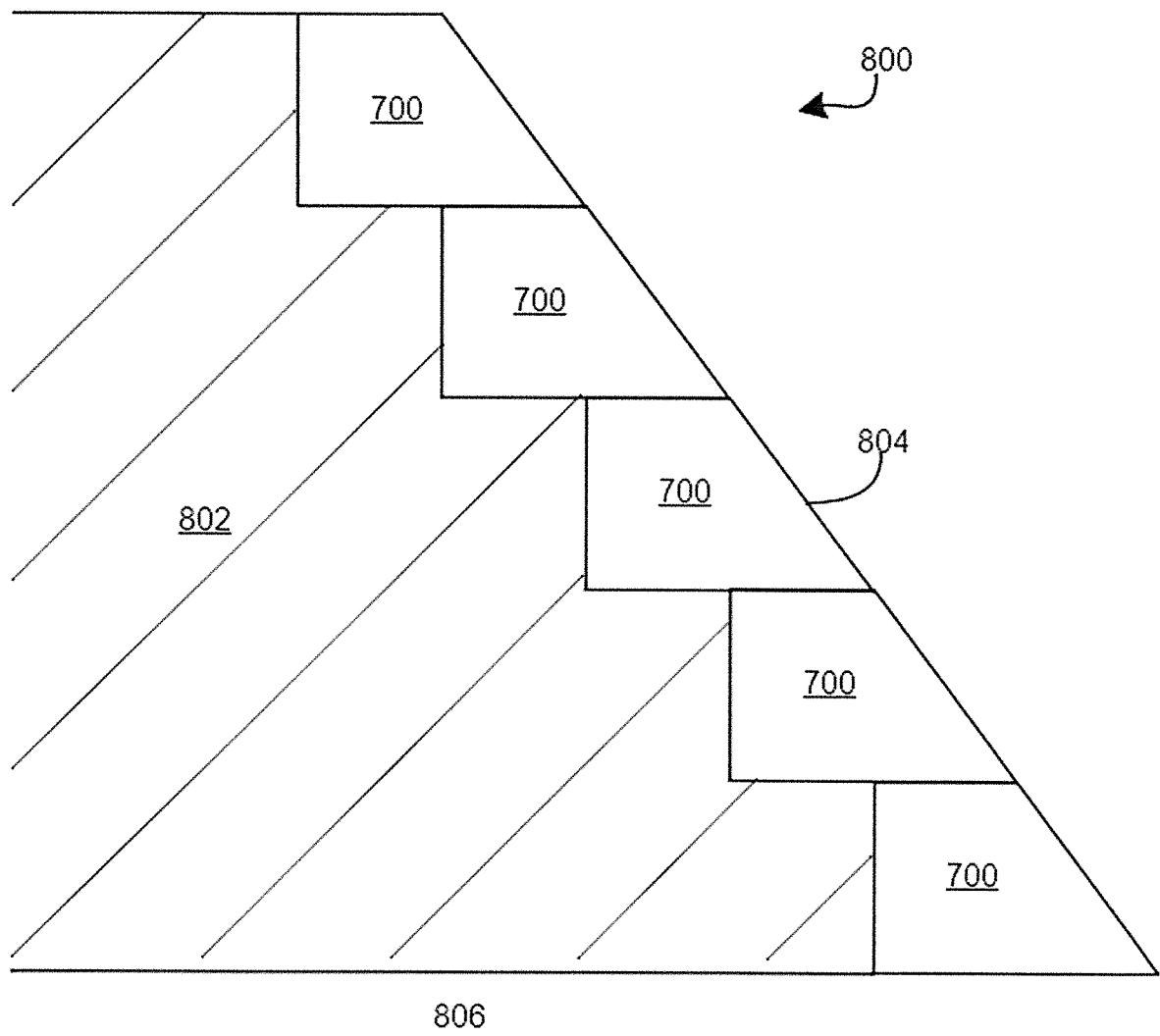
FIG. 8 is a retaining structure erected using the bag of FIG. 7A in accordance with the principles of the present invention.

FIG. 8 shows a retaining structure erected using the bag of FIG. 7A in accordance with the principles of the present invention. The bags 700 extending in a direction perpendicular to the plane of the sheet of paper. A firm foundation 806 is provided for a first bag 700 and then additional bags 700 are stacked on top of a bag underneath. The material to be retained 802 is thus retained by the stack of bags 700. In particular, a structure can be erected such that the slope of the face 804 of the retaining structure 800 slopes at an angle that is the substantially similar to the angle 612 shown in FIG. 6A. Thus, by selecting the appropriate lengths and dimensions for the bag cells 600, a retaining structure 800 having a desired sloping face can be easily constructed.

Although not depicted in FIG. 8, the bottom walls of the cells in the bags 700 can also be allowed to bulge slightly so that they tie into the bag 700 underneath. This feature provides additional strength and stability to the retaining structure 800. In constructing the structure 800, the bags 700 can be filled to different lengths. For example, the bags 700 may be collapsible like an accordion so that pulling (in the direction that the bag extends) on a plurality of folded-up cells may expose and open one cell. This cell can be filled and then the pulling continues to expose and open the next, adjacent cell for filling. If an entire bag 700 is not used when a desired wall length is reached, then the unused cells may be cut away. If, however, additional bags 700 are needed to achieve a desired length, then a bag can be attached to the last cell of a first bag and the pulling, opening, and filling steps continue with the second bag.

Figure 9A:
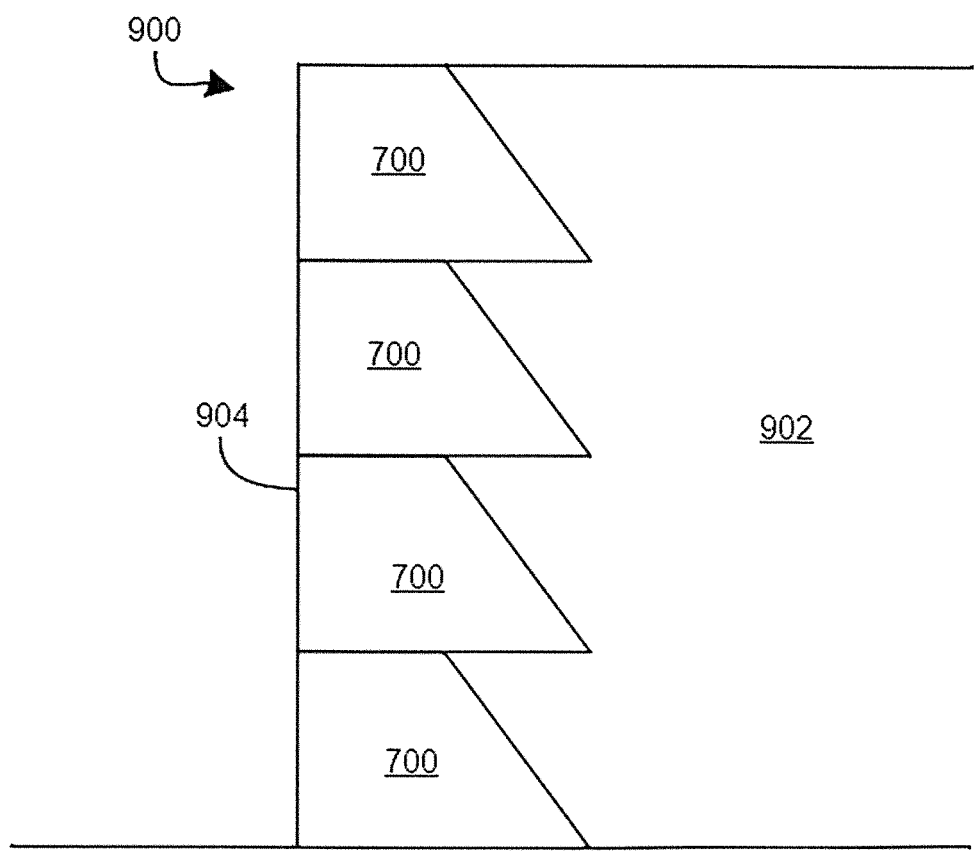
FIG. 9A is an alternative retaining structure erected using the bag of FIG. 7A in accordance with the principles of the present invention.
Figure 9B:
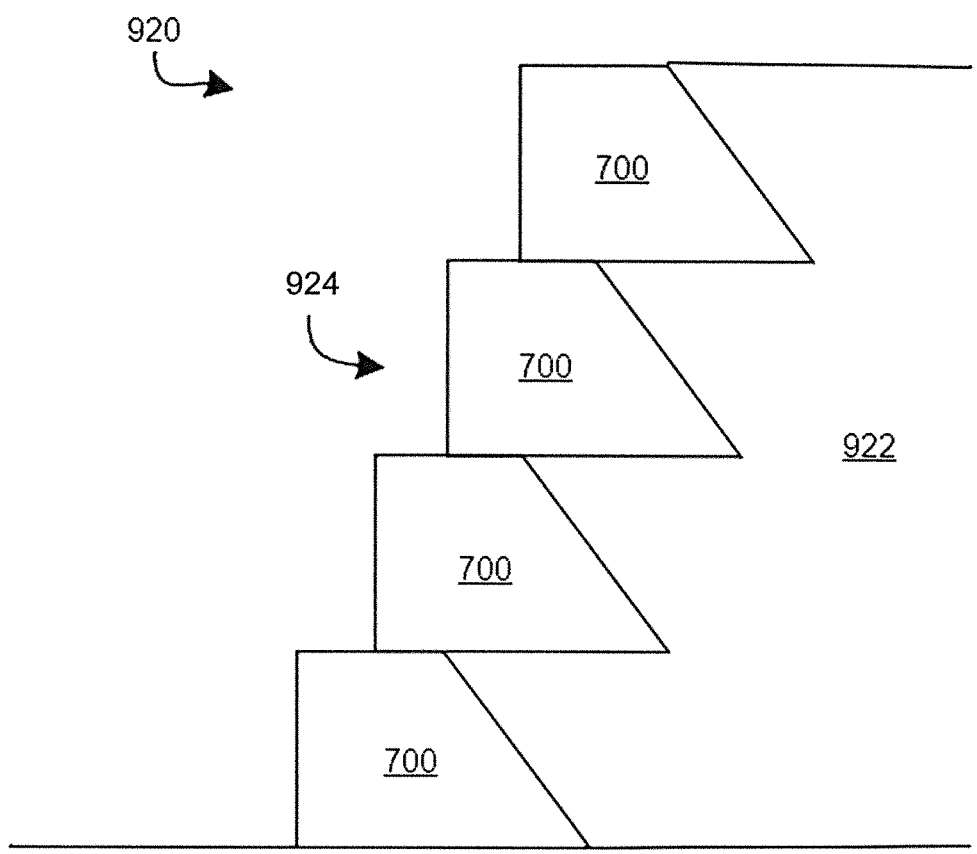
FIG. 9B is an alternative retaining structure erected using the bag of FIG. 7A in accordance with the principles of the present invention.

FIGS. 9A and 9B show an alternative retaining structures erected using the bag of FIG. 7A in accordance with the principles of the present invention. The retaining structures 900 and 920 depicted in these figures illustrate the versatility of the bags 700. In these structures, the substantially straight back wall is exposed and the slanted front wall is in contact with the retained material 902, 922. The exposed façade 904, 924 can then be treated with ornamental, structural (e.g., shotcrete or gunite) or preservative materials as desired.

Figure 10:
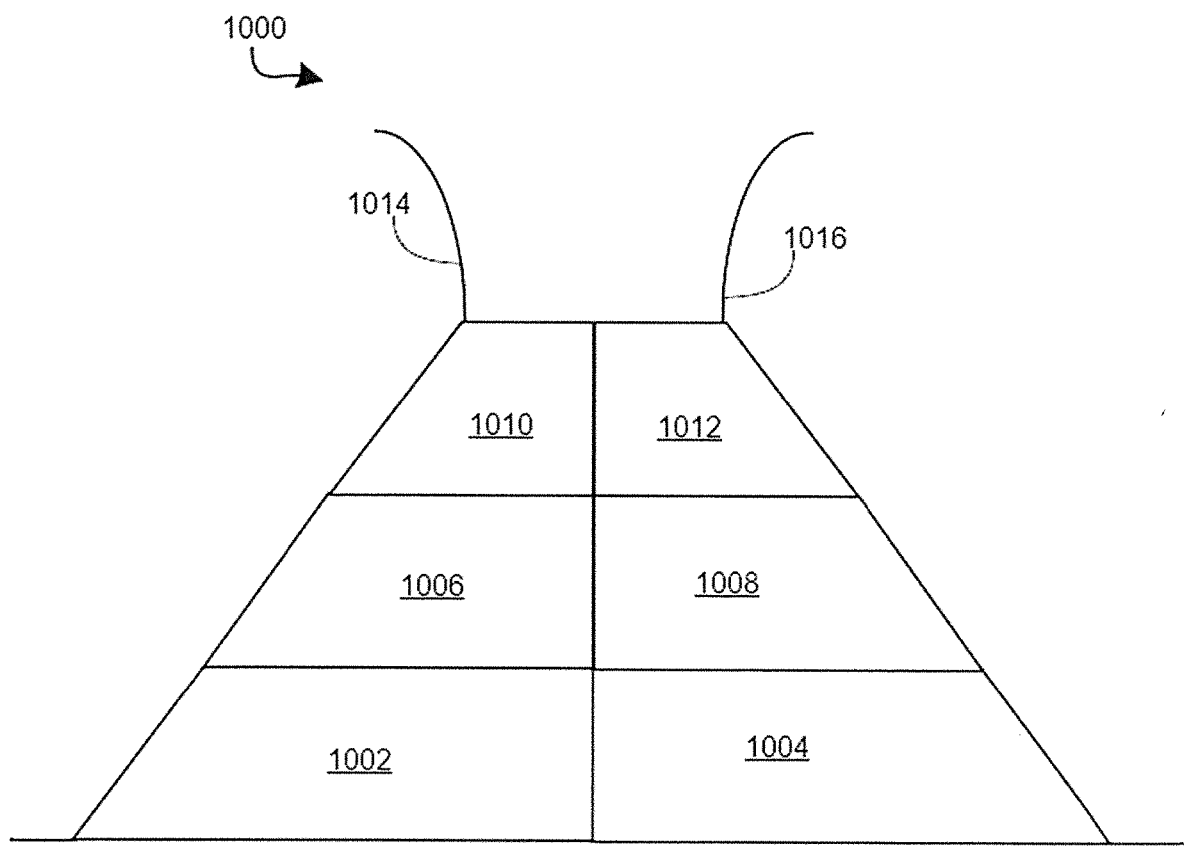
FIG. 10 is a free standing retaining structure capable of being erected in accordance with the principles of the present invention.
Figure 11:
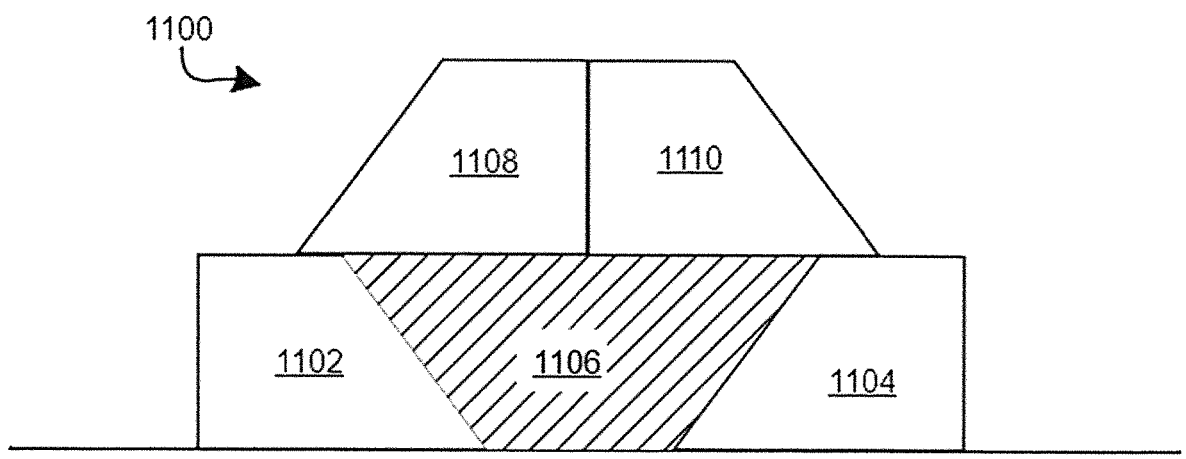
FIG. 11 is another free standing retaining structure capable of being erected in accordance with the principles of the present invention.

FIGS. 10 and 11 illustrate the versatility and ease of use of bags constructed in accordance with the principles of the present invention. The substantially straight back wall allows construction of free-standing structures such as structure 500 that can act, for example, as a levee. Thus, structure 1000 can be constructed without relying on nearby earth or material on one side for its structural strength and integrity. A bag 1002 can be filled and then a corresponding back-to-back bag 1004 can be filled. These two bags provide a foundation for smaller bags 1006 and 1008, which are filled to provide a foundation for even smaller bags 1010 and 1012. Although the structure 1000 in FIG. 10 is depicted as symmetrical, the bags can vary in size so that the slope on one outward-facing side is different than the slope on the other outward-facing side. Top flaps 1014 and 1016 are shown that can be lowered once the bags 1010 and 1012 are filled.

Another alternative structure 1100 is depicted in FIG. 11. Bags 1102 and 1104 can be filled and oriented so as to provide a flat outward face (although they could be flipped around as well). Then material 1106 can fill in the area between the two bags 1102, 1104. Sand, sand bags, concrete, etc. can all be used for the material 1106. On top of this base structure other bags can be placed such as bags 1108 and 1110. Although not shown, additional bags can continue to be stacked to make a retaining structure of a desired height.

Figure 12:
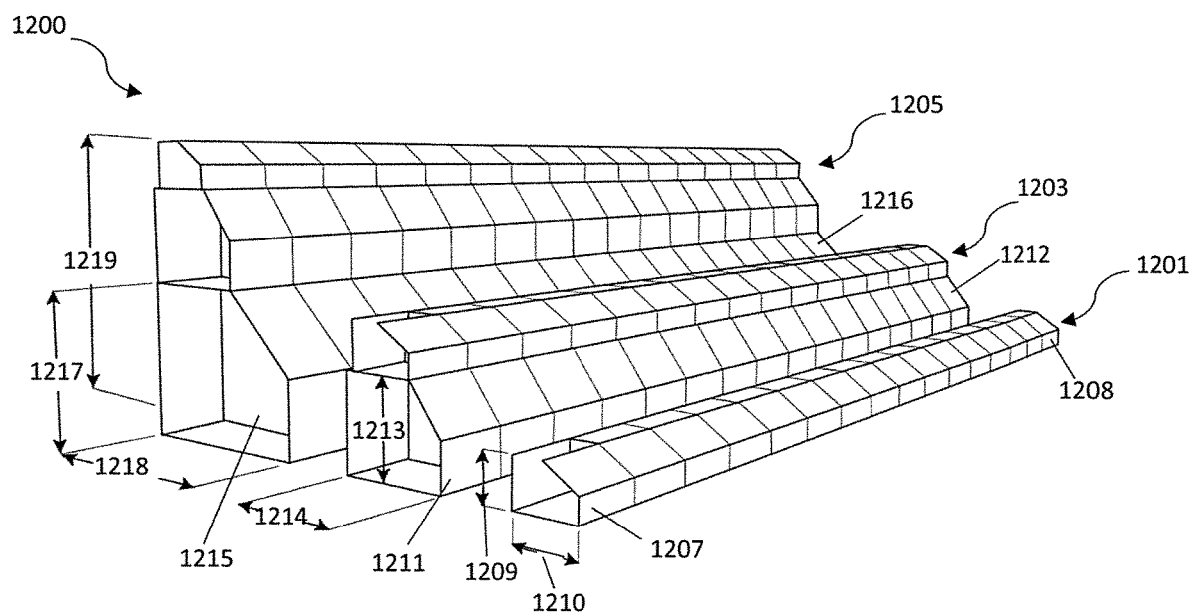
FIG. 12 illustrates free standing retaining structures capable of being erected in accordance with the principles of the present invention.

FIGS. 12-14 present an additional embodiments of the present invention. These embodiments may be substantially similar to the embodiments above and may have the following features.

FIG. 12 illustrates free standing retaining structures 1200 capable of being erected in accordance with the principles of the present invention. Small structure 1201 may be erected by expanding bag 1207 and filling bag cells 1208. Bag 1207 may comprise a height 1209 and a depth 1210. For example, height 1209 may be about 0.6 meters (2 ft.) and depth 1210 may be about 0.85 meters (0.85 ft.).

Medium structure 1203 may be erected by expanding and filling bag 1211, placing bag 1207 on bag 1211, and expanding and filling bag 1211. Bag 1211 may comprise a height 1213 and a depth 1214. For example, height 1213 may be about 1.22 meters (4 ft.) and depth 1214 may be about 1.5 meters (5 ft.). By way of example, medium structure may have a height equal to the sum of height 1209 and 1213. Furthermore, medium structure may have a depth of depth 1214.

Large structure 1205 may be erected by expanding and filling bag 1215, aligning bag 1211 onto bag 1215, expanding and filling bag 1211, aligning bag 1207 onto bag 1211, and expanding and filling bag 1207. Bag 1215 may comprise a height 1217 and a depth 1218. For example, height 1217 may be about 2 meters (6 ft.) and depth 1218 may be about 2.5 meters (8 ft.). Large structure 1205 may have a height 1219 that is the sum of the heights of the bags 1207, 1211, and 1215. For example, height 1219 may be about 2.66 meters (12 ft.). Furthermore, the depth of large structure 1025 may be substantially similar to depth 1218.

The barrier bags 1207, 1211, 1215 may be sized to various sizes: about 0.61 m (2 ft.), about 1.22 m (4 ft.), and about 1.83 m (6 ft.) heights, can be filled with various materials for semi-permanent or permanent installation, and can be stacked on top of each other to provide even larger barriers. The barrier bags 1207, 1211, 1215 may have the option of a double front fabric layer (DL) that can be topped with a closing cover. The double layer option may ensure a longer life to our bags in more severe conditions where the barrier is exposed to excessive abrasion and UV rays for extended periods of time. With the closing cover option the fill material is not eroded from the compacted barrier when wave action or overtopping is encountered.

TABLE 1

Example Barrier Bag Features

| | Model | | |
|---|---|---|---|
| | TBR60 (1207) | TBR120 (1211) | TBS/TBSD200 (1215) |
| Width/depth/height ea. cell | 101.6 cm/76.2 cm/0.85 m (40 in./30 in/2 ft.) | 101.6 cm/139.7 cm/1.22 m (40 in./55 in./4 ft.) | 101.6 cm/243.8 cm/2 m (40 in./96 in./6 ft.) |
| Volume of each cell | 0.458 m$^3$ (0.6 yd$^3$)+/− | 1.682 m$^3$ (2.2 yd$^3$)+/− | 4.511 m$^3$ (5.9 yd$^3$)+/− |
| Cells per 50 ft. | 15 | 15 | 15 |
| Filling volume per 50 ft. | 6.881 m$^3$ (9 yd$^3$)+/− | 25.230 m$^3$ (33 yd$^3$)+/− | 67.280 m$^3$ (88 yd$^3$)+/− |
| Filling weight per 50 ft.* | 12 tons+/− | 44.5 tons+/− | 120 tons+/− |
| Partition Wall | Self-erecting | Self-erecting | Soft |
| Closing cover** | Yes | Yes | Yes |
| Double fabric option (DL)** | Yes | Yes | Yes - TBSD200 |
| Installation frame Required | No | No | Yes |

*Based on 100 lbs per cubic foot
Closing covers and the double fabric option are special orders Each of the differently sized barrier bags 1207, 1211, 1215** (2 ft., 4 ft., & 6 ft.) may individually have a minimum mass-to-hydraulic-load (safety) ratio of 3.5 to 1 at overtopping or greater. This is based on 100 lb. per cubic ft. fill material. That safety ratio is exponentially greater as the water level declines from overtopping or heaver fill is used. The above does not necessarily include stacking: stacking is used to create 2 ft. of freeboard when the 2 ft. is stacked on top of the 4-ft. barrier or the 4 ft. is stacked on the 6 ft. This may provide a 3+ to 1 safety ratio.

Figure 13A:
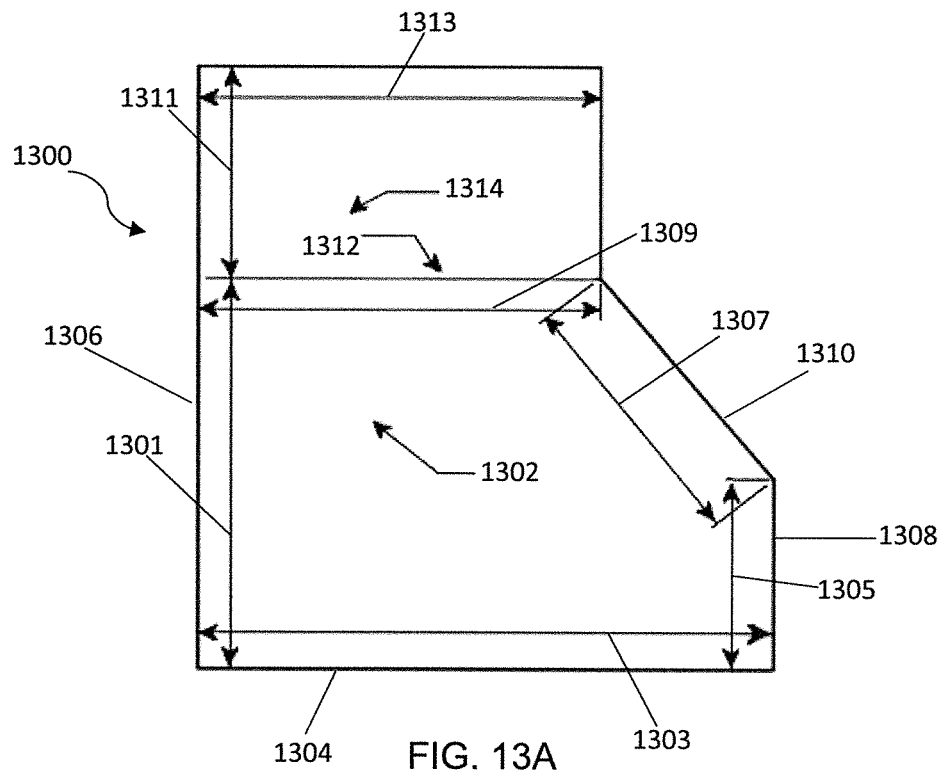
FIG. 13A is a side cross-sectional view of another bag with a fold extended in accordance with the principles of the present invention.

FIG. 13A is a side cross-sectional view of another bag 1300 with a flap extended in accordance with the principles of the present invention. The bag 1300 may be substantially similar to one or more of the bags 1207, 1211, and/or 1215. The bag 1300 may comprise a side wall 1302. The bag 1300 may comprise a bottom wall 1304, a back wall 1306, a toe wall 1308, and a slanted wall 1310. In some embodiments, bag 1300 may comprise a top wall. The side wall may be 1.63 m$^2$. The back wall 1306 may be 1.22 m, the toe wall 1308 may be 0.61 m, the slanted wall 1310 may be 0.76 m, and the bottom wall 1304 may be 1.45 m.

The bag 1300 may further comprise a flap 1314. The flap 1314 may be attached to the side wall 1302 at a fold 1312. The flap 1314 may comprise a height 1311 and a depth 1313. In some embodiments, the height 1311 may be about 0.61 meters and the depth 1313 may be about 1.00 meters. The height 1311 may be 0.61 m, the depth 1313 may be 1.00 m, and the area of the flap may be 0.61 m$^2$.

Figure 13B:
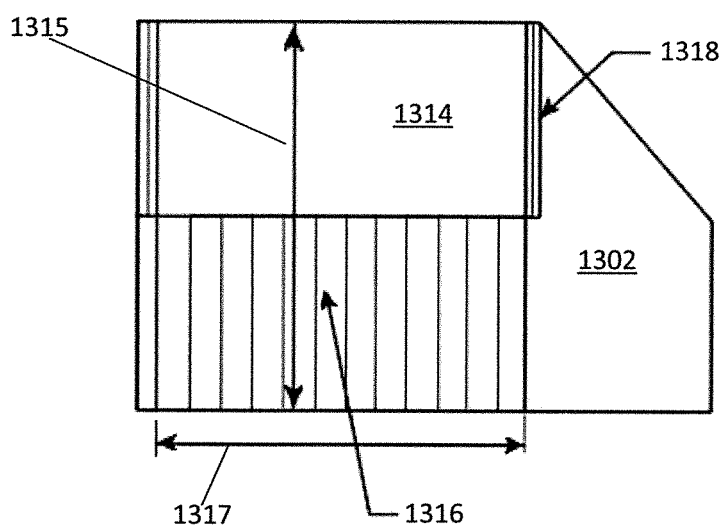
FIG. 13B is a side cross-sectional view of the bag of FIG. 13A with the flap folded in accordance with the principles of the present invention.

FIG. 13B is a side cross-sectional view of the bag of FIG. 13A with the flap 1314 folded in accordance with the principles of the present invention. The side wall 1302 may further comprise envelope 1316. The envelope 1316 may comprise a material connected with the side wall 1302, such as by stitching at stitch line 1318. Furthermore envelope 1316 may be open under the flap 1314 near fold 1312 such that envelope 1316 may receive the rigid support. A height 1315 of the envelope 1316 may be about 1.22 m. A width 1317 of the envelope 1316 may be about 95 cm. The rigid support may comprise coroplast or any other sufficiently rigid material.

The bag 1300 may be a low cost, rapid deploy flood and erosion control barrier bag similar to, yet superior than, conventional sandbags. The bags 1300 may be designed to protect life and property from natural disasters such as flash flooding, mudslides, mud flows, levee breaches and storm surge. The bag 1300 may be versatile and may be used for other kinds of protection from security barriers to stormwater control.

The bag 1300 may be a series of pentagon-shaped bags that may be sloped on one side, vertical on the opposite side and open at the top for filling. Each of the cells may be connected side by side like an accordion, each cell may have a common wall with the next cell, and may be collapsed during storage and/or deployment. The cells may be made of high-strength textile. Each of the cells may be self-contained yet may rely on the next cell for added strength. If one of the cells is compromised, the cell may not necessarily affect the rest of the barrier, which may remain standing strong.

The bag 1300 may use 40% less fill material than a stacked sandbag wall, but more importantly one 100-foot section of 4-foot-high bags 1300 may replace approximately 8,000 sandbags making the bags 1300 an excellent alternative to small and large sandbags.

The bag 1300 may be marketed as TrapBag®. The bags 1300 may be useful for, but not limited to, the following: Flood Protection, Chemical or Oil Spills, Temporary Cofferdam, Levee Raising, Property Protection, Riverbank Stabilization, Gravity (MSE) Walls, Mudslide Redirection, Infrastructure Protection, Water Reservoirs, Dune Stabilization, and/or Beach Erosion.

Embodiments of the present invention include TBR models of the bag 1300. Because our 2 ft. and 4 ft. bags 1300 may be built with a rigid partition wall between the cells, installation time may be drastically reduced in these embodiments, because these bags 1300 can be set up without using the installation frames. One or more rigid partitions may be contemplated within a single trap bag cell. The rigid partition can, for example, be constructed of a material such as Coroplast and may have a thickness of between about 0.64 cm (0.25 inches) to 5.08 cm (2 inches). The thickness of the rigid partition may be such that it could allow the trap bag to be free standing when unfilled without the need for external supports or frames. Thus, the weight and thickness of the material of the other portions of the trap bag may be considered when determining how thick the rigid partition may be. The rigid partition may be such that it can be stitched, glued, welded or adhered to the inside portion of the bag 1300. Additionally, the 1316 envelope may be sewed into the bag 1300 in order to receive the rigid partition within an opening of the envelope 1316. Thus, the bag 1300 may be bendable and foldable along multiple axes without the rigid partition inserted into the envelope 1316. The shape of the envelope 1316 may be substantially the same as the cross section of the inside of the bag 1300 and the opening can, for example, be at the top of the envelope 1316. The rigid partition may be sized to substantially fill the envelope 1316. Alternatively, the envelope 1316 may be rectangular in shape and, referring to the attached drawing (FIGS. 13A and 13B), be placed in a region that, in the attached drawing, may be 1.00 m in width and 1.22 m in height. Thus, the envelope 1316 may not necessarily coincide with the trapezoidal region to the right of the aforementioned rectangular region. Accordingly, the partition wall may include a rigid portion (e.g., the envelope 1316 with the rigid partition) and a flexible portion coinciding with the trapezoidal portion of the cross-sectional area of the bag 1300. The rigid partition within such an envelope 1316 may still provide a free-standing bag 1300 and allow the trapezoidal region to fill and extend outward as material is added to the bag 1300.

Figure 14A:
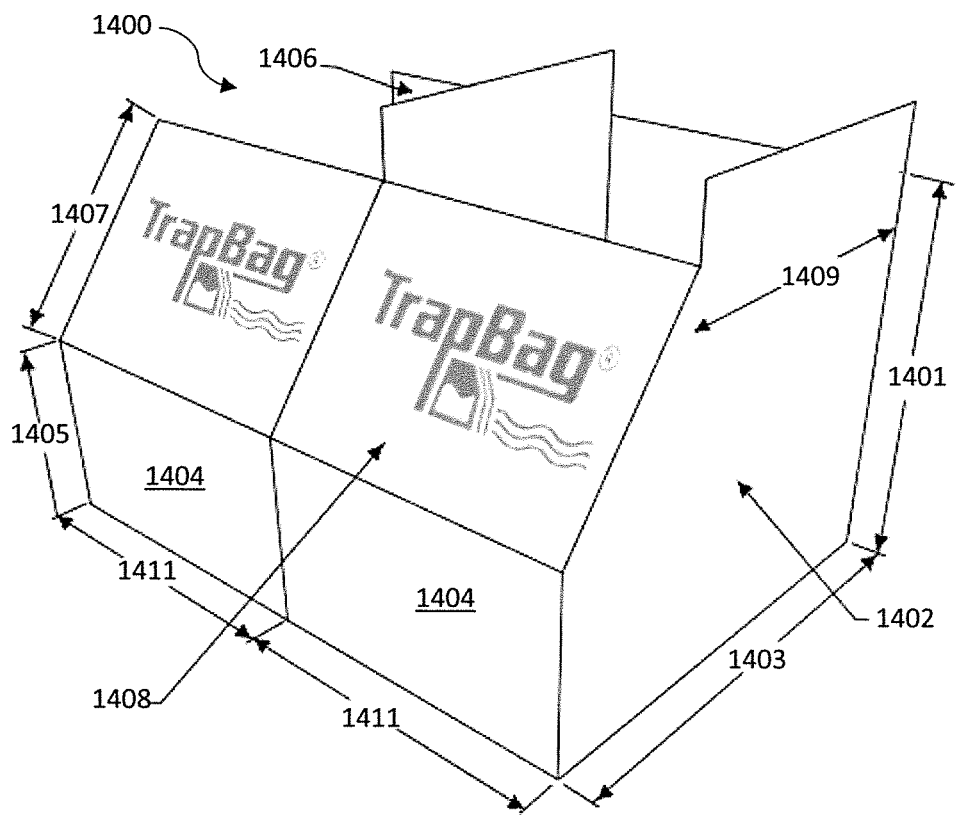
FIG. 14A is an alternate view of the bag of FIG. 13 in accordance with the principles of the present invention.

FIG. 14A is an alternate view of the bag of FIG. 13 in accordance with the principles of the present invention. The bag 1400 may be substantially similar to the bag 1300 with the following features. Referring to the other drawing (FIGS. 14A and 14B), two cells 1404 of a trap bag 1400 are shown by way of example. The end wall 1402 may include an envelope and/or rigid partition as well. The trap bag 1400 may be extended for any number of a plurality of cells 1404 such that each partition 1406 between cells 1404 is rigid as well as the terminating end wall 1402. The plurality of cells 1404 can be folded like an accordion and the two terminating end walls 1402 can be pulled away from one another to unfold and extend the trap bag cells 14004 into a free-standing wall structure that can be filled with material. Preferably, the partition 1406 between cells 1404 is constructed of the same material as the other portions of the trap bag 1400 and forms an envelope with solid sides of material on both sides of the envelope. Each cell 1404 may be expandable to a width 1411. Furthermore, cells 1404 may comprise a bottom depth 1403 and a top depth 1409. The cells 1404 may comprise a height 1401. Furthermore, cells 1404 may comprise a toe height 1405 and a slanted wall length 1407 corresponding to the slanted wall 1408. A rigid solid sheet of material may then be placed in the envelope to substantially fill the envelope.

By way of example, some features may include: lengthened cells to reduce cost and increase speed of manufacturing. (e.g. lengthened from 3 ft. width to 1 meter 15 cells in a chain verses 17 cells); widened opening for easer filling (e.g. 1 m×1 m verse 3 ft.×3 ft.); larger flat widened top to accept 2 ft. small barrier 1207 to be stacked on top of 4 ft. medium barrier 1211 and likewise a 4 ft. medium barrier 1211 to be stacked on top of a 6 ft. large barrier 1215; shortened base and elevating the top of the toe for ease and more complete filling; shorting the base to better fit on the widened flat top of the 1 size taller barrier; incorporation of an envelope in the partition to except a panel to give each cell the ability to be self-supporting; elimination of any exterior support frame or sled to hold the cell open during filling; elimination of any exterior support eliminates the cost of these frames to the end user; elimination of any exterior support eliminates the cost of the logistics of the frames; reduces the number of personnel to fill the barriers by 66% from 6 personnel to 2 and therefore increase safety as well; makes the product much more air mobile in an emergency; reduced length of chain from 100 ft. to 50 ft. for ease of handling by hand.

Figure 14B:
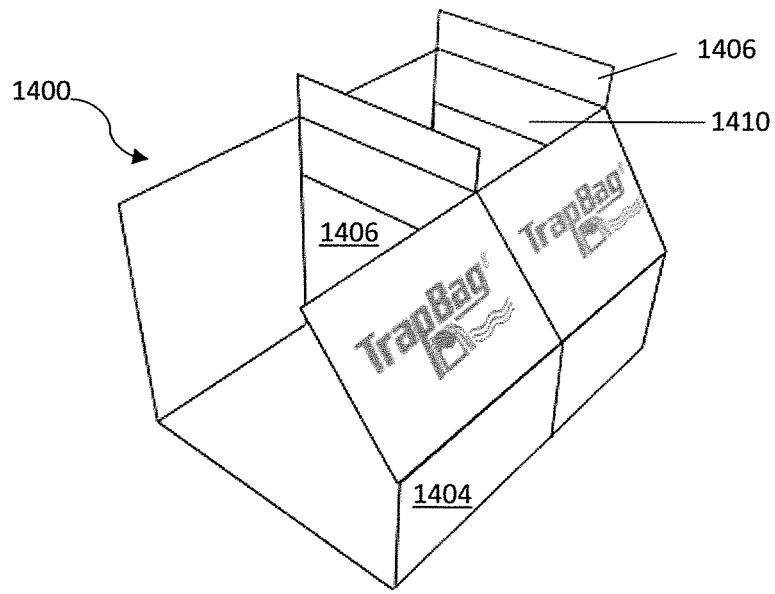
FIG. 14B is another alternate view of the bag of FIG. 14A in accordance with the principles of the present invention.

FIG. 14B is another alternate view of the bag 1400 of FIG. 14A in accordance with the principles of the present invention. As illustrated, partition 1406 may be positioned between cells 1404. Furthermore, partition 1406 may comprise envelope 1410.

The invention claimed is:

1. A bag comprising a plurality of adjacent bag cells, wherein each bag cell of the plurality of bag cells comprises: at least one flexible sheet of material; a back substantially orthogonal to a bottom, the back defining a back surface area and the bottom defining a bottom surface area; a top opposing the bottom, the top defining a top surface area; a front opposite the back; opposing sides, wherein at least one side of the opposing sides includes an envelope configured to receive a support structure therein, at least one side of the opposing sides includes a portion transverse to a plane defined by the top surface area and at least one of the opposing sides is associated with an adjacent bag cell of the plurality of adjacent bag cells, wherein the support structure comprises a rigid partition, the rigid partition forming an engagement with the envelope whereby the rigid partition is positioned in a planar relationship with the at least one of the opposing sides enabling the plurality of bag cells to be free standing when unfilled without the need for external support; wherein the bottom, the top, the back, the front and the opposing sides define a bag cell chamber, the top including an opening to the bag cell chamber; wherein the bottom surface area is greater than either the back surface area or the top surface area; and wherein at least one of the opposing sides is configured to expand laterally against a side of an adjacent bag cell responsive to a force applied to the at least one opposing side from within the bag cell chamber.

2. The bag of claim 1, further comprising at least part of a support structure frictionally fit in at least part of the envelope.

3. The bag of claim 1, further comprising an additional flexible sheet of material covering at least part of the flexible sheet of material.

4. The bag of claim 1, wherein the flexible sheet is configured such that the opening of the top is substantially rectangle shaped.

5. The bag of claim 1, wherein the flexible sheet is configured such that a cross-sectional shape of the bag is substantially a right pentagon.

6. The bag of claim 5, wherein the bottom is about 0.85 meters long and the back is about 0.6 meters long.

7. The bag of claim 5, wherein the bottom is about 1.5 meters long and the back is about 1.22 meters long.

8. The bag of claim 5, wherein the bottom is about 2.5 meters long and the back is about 2 meters long.

9. The bag of claim 5, wherein the front comprises a toe section orthogonal to the bottom and a slanted section connected with the toe section and offset at an angle relative to the toe section.

10. The bag of claim 9, wherein the toe section is about 0.61 meters long, the slanted section is about 0.76 meters long, the bottom is about 1.45 meters long, and the back is about 1.22 meters long.

11. The bag of claim 5, wherein the side further comprises a flap comprising a rectangle of flexible material connected with the top of the side.

12. The bag of claim 11, wherein the flap further comprises a length of about 0.61 meters and a width of about 1.00 meters.

13. The bag of claim 5, with 1 meter width bag with 15 connected chambers.

14. The bag wall of claim 13, with chamber openings of 1 m×1 m.

15. The bag of claim 1, wherein the other opposing side includes an additional envelope.

16. A bag comprising a plurality of adjacent bag cells, wherein each bag cell of the plurality of bag cells comprises: at least one flexible sheet of material; a back substantially orthogonal to a bottom, the back defining a back surface area and the bottom defining a bottom surface area; a top opposing the bottom, the top defining a top surface area; a front opposite the back; opposing sides, wherein at least one side of the opposing sides includes an envelope configured to receive a rigid partition therein, the rigid partition being positioned in a planar relationship with the at least one side of the opposing sides whereby the plurality of adjacent bag cells are free standing when unfilled without the need for external support, and at least one of the opposing sides is associated with an adjacent bag cell of the plurality of adjacent bag cells; wherein the bottom, the top, the back, the front and the opposing sides define a bag cell chamber, the top including an opening to the bag cell chamber; wherein the bottom surface area is greater than either the back surface area or the top surface area; and wherein at least one of the opposing sides includes a portion extending transversely to a plane defined by the opening to the bag cell chamber and at least one of the opposing sides includes an opening to the bag cell chamber of the adjacent bag cell of the plurality of adjacent bag cells, the opening being configured to enable movement of contents between bag cell chambers of the plurality of adjacent bag cells.

* * * * *